UNITED STATES PATENT OFFICE.

FRANCIS A. J. FITZ GERALD AND PETER McN. BENNIE, OF NIAGARA FALLS, NEW YORK, ASSIGNORS TO GENERAL ELECTRIC COMPANY, A CORPORATION OF NEW YORK.

PRODUCTION OF TITANIUM OXIDS.

No. 921,686.  Specification of Letters Patent.  Patented May 18, 1909.

Application filed November 18, 1907. Serial No. 402,632.

*To all whom it may concern:*

Be it known that we, FRANCIS A. J. FITZ GERALD, a subject of the King of Great Britain, and PETER McN. BENNIE, a citizen of the United States, both residing at Niagara Falls, county of Niagara, and State of New York, have invented certain new and useful Improvements in the Production of Titanium Oxids, of which the following is a specification.

This invention consists of a process of treating titanium ore for the production of titanium oxid, in particular, for the production of titanium oxid of a relatively high degree of purity.

The process is of a general nature, and is applicable to various complex oxids of iron and titanium, but we have hereinafter described the process as applied to the titanium iron ore known as ilmenite.

According to our invention the ore is crushed, and after a preliminary magnetic separation is mixed with a reducer, as carbon and heated to a temperature sufficiently high to reduce the iron, but not the titanium, to the metallic state. The metallic iron is subsequently removed by magnetic and acid treatments. The final product is an oxid of titanium of a high degree of purity.

Ilmenite ore we may assume to have the approximate formula $FeO.TiO_2$. It is an iron-black mineral of uneven cleavage, with a specific gravity of about 4.7.

The ilmenite ore is often accompanied with considerable quantities of magnetite, the magnetite occurring, so to speak, as a gangue. In order to concentrate the ilmenite as far as possible before furnace treatment, it is crushed in order to mechanically free this magnetite from the ilmenite. Advantage may then be taken of the magnetic properties of the magnetite for a magnetic separation according to well-known methods. The next step in our process consists in mixing this purified ilmenite with the reducer, for furnace treatment to bring about reduction of the iron. As a reducing agent we prefer to use petroleum coke. This coke is prepared by crushing and subsequent calcination in order to remove volatile components.

The mixture should contain about 7.3 to 10.6 per cent. carbon. As will be seen from a consideration of the reactions involved within these limits, no definite proportion of ore and reducer is essential.

Assuming ilmenite to have the formula $FeO.TiO_2$ and 7.3 per cent. of carbon is used, the following reaction will probably take place:

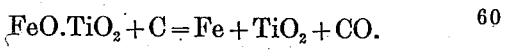

$$FeO.TiO_2 + C = Fe + TiO_2 + CO.$$

With the 10.6 per cent. of carbon the following reaction may be expected:

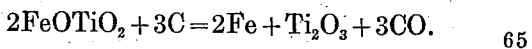

$$2FeOTiO_2 + 3C = 2Fe + Ti_2O_3 + 3CO.$$

As all that is necessary is to effect reduction of the iron to the metallic state, the percentage of carbon may be such that both reactions occur.

The mixture of crushed ore and carbon is now placed in a suitable furnace. An electric furnace built on the principle shown in United States Patent #792,255, Fitz Gerald and Bennie, will be found serviceable, but the process is by no means limited to this particular style of furnace. For example, a form of arc furnace, or a crucible electric furnace, would readily adapt itself for the purpose.

The charge is heated to a temperature sufficiently high to effect a reduction of the iron oxid and a partial fusion of the charge. No exact temperature can be given for the reaction but it is estimated to approximate 1800° centigrade. This temperature will give a sintered mass which may more easily be crushed than the compact, fused mass resulting from a higher temperature.

After removal from the furnace the sintered mass is crushed in order to mechanically free the metallic particles of iron from the titanium oxid. The crushed mass is then run through a magnetic separator which removes nearly all of the iron. The non-magnetic portion is then treated with acid in order to remove as completely as possible the small amount of iron not removed by magnetic separation. We have found digestion with 10% sulfuric acid until no further action took place to be an effective acid treatment. The powder remaining after acid treatment is now washed and dried.

We have found that when more than the minimum amount of carbon has been added, the remaining mass is a dark blue, crystalline powder. Its color changes to a yellowish hue upon ignition in the air, and there is likewise observed an increase in weight. According to our understanding these changes are due to an oxidation of the partially reduced titanium oxid, as for example, an oxidation of $Ti_2O_3$ to $TiO_2$. The yellowish tint of the final product is probably given to it by the trace of remaining iron.

The final product will be found to be practically pure titanium oxid, less than one per cent. of iron remaining as an impurity.

What we claim as new and desire to secure by Letters Patent of the United States, is,—

1. The process which consists in subjecting crushed ilmenite to the reducing action of powdered carbon, producing a sintered mass therefrom, subsequently crushing the sintered mass, and removing the reduced iron from said mass.

2. The process, which consists in crushing a titanium iron ore, subjecting said ore to a reducing agent at a temperature high enough to reduce the iron but not the titanium, subsequently crushing the reduction product and removing the reduced iron.

3. The method which consists in magnetically separating admixed iron ore from crushed titanium ore, partially reducing said ore with carbon, subsequently crushing the resulting sintered mass, and removing the reduced iron from said mass.

4. The process which consists in heating a mixture of carbon and crushed titanium ore containing iron to a temperature sufficient to reduce the iron oxid without completely reducing the titanium oxid with the formation of a sintered mass, and subsequently segregating the titanium oxid.

5. The process which consists in heating a mixture of crushed ilmenite and carbon to a temperature of about 1800 degrees C., crushing the resulting mass, and purifying the same by magnetic separation and acid treatment.

6. The process which consists in crushing titaniferous-iron ore magnetically concentrating same, subjecting said ore to the reducing action of carbon at a temperature sufficiently high to effect reduction of the iron oxid, in said ore but not sufficiently high to reduce the titanium oxid, crushing the product and magnetically purifying the same.

7. The process of obtaining titanium oxid which consists in mixing crushed titanium iron ore with sufficient carbon to completely reduce the iron, heating the mass to a temperature at which the iron, but not the titanium, is reduced to the metallic state, crushing the resulting mass, and removing the reduced iron.

8. The process of isolating the titanium oxid from an iron bearing titanium ore which consists in mixing the crushed ore with carbon of sufficient mass to completely reduce the iron, but not the titanium, heating this mixture to a sintering temperature, crushing the sintered mass, and magnetically removing the reduced iron.

In witness whereof, we have hereunto set our hands this fifteenth day of November, 1907.

FRANCIS A. J. FITZ GERALD.
PETER McN. BENNIE.

Witnesses:
MARY JAMES,
CHARLES MAURICE FITZ GERALD.